Figure 1:
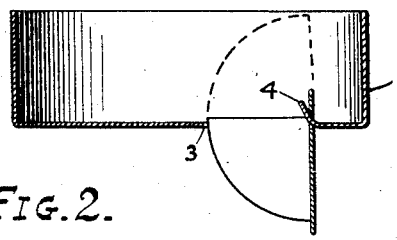

J. YOUNGBERG.
RECEPTACLE SPOUT.
APPLICATION FILED MAY 7, 1918.

1,328,704.

Patented Jan. 20, 1920.

INVENTOR.
JAMES YOUNGBERG
BY
Carlos P. Griffin
ATTORNEY.

UNITED STATES PATENT OFFICE.

JAMES YOUNGBERG, OF ALAMEDA, CALIFORNIA, ASSIGNOR TO WILLIAM CLUFF COMPANY, OF SAN FRANCISCO, CALIFORNIA, A CORPORATION OF CALIFORNIA.

RECEPTACLE-SPOUT.

1,328,704. Specification of Letters Patent. Patented Jan. 20, 1920.

Application filed May 7, 1918. Serial No. 233,168.

*To all whom it may concern:*

Be it known that I, JAMES YOUNGBERG, a citizen of the United States, residing at Alameda, in the county of Alameda, State of California, have invented a new and useful Receptacle-Spout, of which the following is a specification in such full and clear terms as will enable those skilled in the art to construct and use the same.

This invention relates to a receptacle spout and an object of the invention is to provide means whereby the spout and receptacle top can be assembled as a unit, with the least possible labor and machinery to produce an effective and secure spout.

It will be observed by those skilled in the art, that while many spouts for the use of pouring granular materials from receptacles containing them have been used heretofore, that one of the most serious difficulties standing in the way of the use of such spouts, is the difficulty of assembling them with the receptacle at a price low enough to make the spouts applicable to all receptacles sold with the materials purchased as baking powders, sodas, etc.

In the present instance, the spout is pushed into place and the hinge secures it in place by one blow of a hammer or one movement of a press.

Another object of the invention is to provide means whereby the spout will be prevented from moving out of the receptacle more than 90 degrees, and whereby it cannot be pushed into the receptacle without breaking the spout or the fastening tongue.

Other objects of the invention will appear as the description proceeds.

An embodiment of the invention is shown in the drawings in which the same reference numeral is applied to the same portion throughout, but I am aware that there may be modifications thereof.

Figure 2:
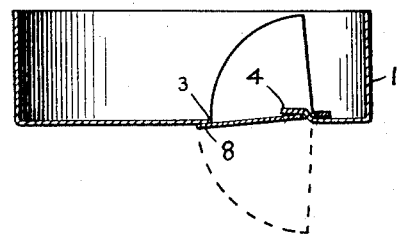
Figure 4:
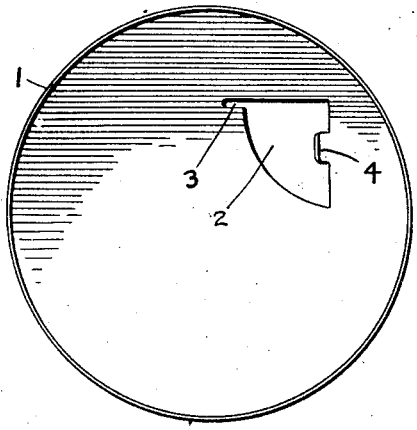
Figure 3:
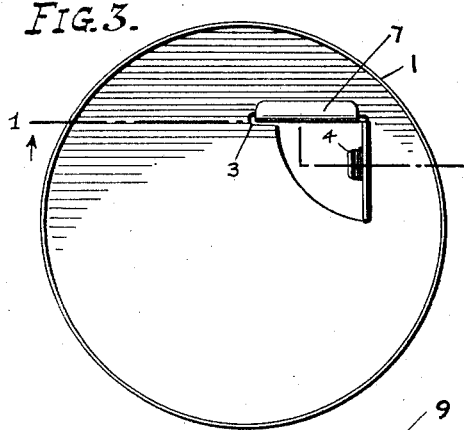
Figure 5:
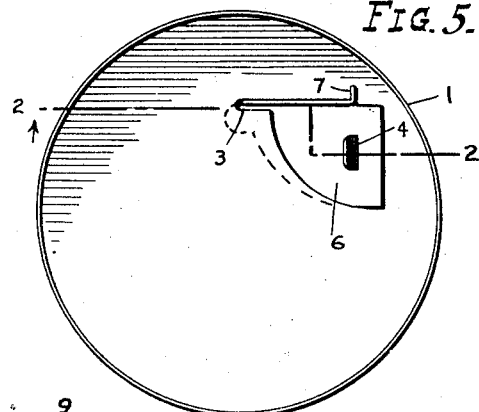
Figure 6:
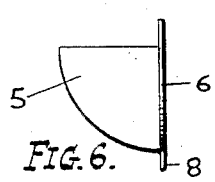
Figure 7:
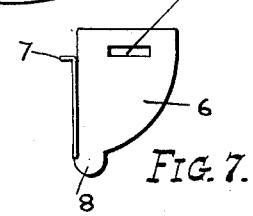
Figures 8, 9:
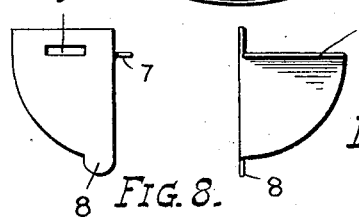
Figure 10:
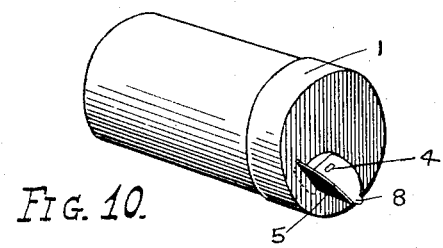

Figure 1 is a vertical sectional view of the cover of a receptacle showing the manner of application of the spout thereto, Fig. 2 is a vertical sectional view of the cover with the spout closed and showing the means for securing the spout to the cover, Fig. 3 is a bottom plan view of the receptacle cover with the spout open, Fig. 4 is a bottom plan view of the receptacle cover with the spout removed therefrom, Fig. 5 is a bottom plan view of the receptacle cover showing the spout closed, Fig. 6 is an edge elevation of the spout, Fig. 7 is a side elevation of the spout turned at right angles to Fig. 6, Fig. 8 is a plan view of the spout as it would appear in the closed position in the top of the receptacle, Fig. 9 is a side elevation of the spout looking from the right of Fig. 8, and Fig. 10 is a perspective view of a receptacle having this spout applied thereto, and showing the spout in a position to pour granular materials from the receptacle.

The numeral 1 represents a receptacle cover which may be of any desired form. This receptacle cover has a quarter sector removed therefrom, as indicated at 2, and is provided with a slot 3 and with a projecting lip 4. The spout comprises two quarter sector members 5 and 6, one of which has a flange 7 formed thereon, and the other of which has a tab 8 and a slot 9 cut therein. The sector 6 is large enough to overlap the opening 2, as illustrated in Fig. 5, so as to prevent the leakage of materials from the receptacle, and the tab 8 enables the user to easily open the spout.

In its manufacture, the opening 2 is died out of the cover 1, and the lip 4 is then left in the position shown in Fig. 1. The workman then assembles the spout by pulling it into the opening as shown in Fig. 1, whereupon the spout is turned down flat as indicated in Fig. 2, and with a light hammer or other instrument the lip 4 is pressed down, as shown in Fig. 2. This prevents the spout from coming loose from the cover, and provides it with a hinge upon which it may turn. In practice, the spout may be made tight enough in the opening 2 to hold in any desired position by friction, or a suitable air tight cover may be placed over the top of the spout if desired to prevent the escape of aromatic flavors from materials contained within the receptacle.

The principal advantage of this spout lies in the fact that it has no solder to connect it to the receptacle top and is very easily and simply assembled, and when once assembled will not readily dislodge.

Having thus described my invention, what I claim as new and desire to secure by Letters Patent of the United States is as fol- lows, express reservation being made of permissible modifications.

A receptacle for discharging granular materials comprising a slotted spout having sector shaped members formed to lie in two planes one of which has a flange at right angles thereto, and a receptacle provided with an opening to receive the spout and with a tongue to pass through the slot, said tongue being bent down on the spout to hold it in place, and one member of the spout extending into a narrow slot to prevent lateral movement thereof.

In testimony whereof I have hereunto set my hand this 23rd day of April, A. D. 1918.

JAMES YOUNGBERG.